United States Patent
Runde et al.

(10) Patent No.: US 9,885,442 B2
(45) Date of Patent: Feb. 6, 2018

(54) APPARATUS, SYSTEM, AND METHOD FOR ASSEMBLY OF AN EXHAUST AFTERTREATMENT COMPONENT

(71) Applicant: Cummins IP, Inc., Minneapolis, MN (US)

(72) Inventors: William Runde, Janesville, WI (US); Eric Butler, Madison, WI (US); Shane O'Connor, Cottage Grove, WI (US)

(73) Assignee: CUMMINS IP, INC., Minneapolis, MN (US)

( * ) Notice: Subject to any disclaimer, the term of this patent is extended or adjusted under 35 U.S.C. 154(b) by 221 days.

(21) Appl. No.: 14/442,998

(22) PCT Filed: Nov. 18, 2013

(86) PCT No.: PCT/US2013/070533
§ 371 (c)(1),
(2) Date: May 14, 2015

(87) PCT Pub. No.: WO2014/078776
PCT Pub. Date: May 22, 2014

(65) Prior Publication Data
US 2015/0300555 A1    Oct. 22, 2015

Related U.S. Application Data

(60) Provisional application No. 61/727,512, filed on Nov. 16, 2012.

(51) Int. Cl.
*F16L 59/16* (2006.01)
*F01N 13/18* (2010.01)
*F01N 13/16* (2010.01)

(52) U.S. Cl.
CPC .......... *F16L 59/16* (2013.01); *F01N 13/1827* (2013.01); *F01N 13/16* (2013.01);
(Continued)

(58) Field of Classification Search
CPC ........ B01D 29/56; B01D 46/00; B01D 39/06; B01D 46/42; F01N 3/10; F16L 23/00
(Continued)

(56) References Cited

U.S. PATENT DOCUMENTS 6,234,545 B1    5/2001   Babuder et al.
6,767,378 B2 *  7/2004   Nishiyama ............ F01N 3/0814
                                              55/309
(Continued)

OTHER PUBLICATIONS

Search Report and Written Opinion for PCT/US2013/070533, dated Apr. 3, 2014, 6 pages.

*Primary Examiner* — Duane Smith
*Assistant Examiner* — Minh-Chau Pham
(74) *Attorney, Agent, or Firm* — Foley & Lardner LLP

(57) ABSTRACT

An exhaust aftertreatment assembly for treating exhaust gas. According to various embodiments, a first housing has a first end and a second housing has a second end, the second end being coupled to the first end. At least one alignment bracket is coupled to the first housing proximate the first end. An annular gasket is supported on the at least one alignment bracket between the first and second ends. The at least one alignment bracket may comprise a base having a curved surface conforming to the interior surface of the housing, the base having a length that is less than a circumference of the interior surface. A stop arm extends substantially transversely from the base. A support arm extends substantially transversely from the stop arm and substantially parallel to the base. An insulation receiving space is defined between the base, stop arm, and support arm.

21 Claims, 4 Drawing Sheets

(52) U.S. Cl.
CPC ...... *F01N 2260/10* (2013.01); *F01N 2260/26* (2013.01); *F01N 2310/00* (2013.01); *F01N 2450/00* (2013.01)

(58) Field of Classification Search
USPC ......... 55/425, 495, 309, 343, 418, 482, 484, 55/DIG. 30, 385.3, 498, 502, DIG. 10; 60/297, 299, 301, 311, 322; 422/177, 422/180; 180/89.2; 181/213
See application file for complete search history.

(56) References Cited

U.S. PATENT DOCUMENTS

| | | | |
|---|---|---|---|
| 7,503,956 B2* | 3/2009 | Thaler | B01D 46/0001 422/180 |
| 7,517,380 B2* | 4/2009 | Grimm | B01D 46/001 180/89.2 |
| 8,066,792 B2* | 11/2011 | Wadke | F01N 3/103 422/177 |
| 8,246,709 B2* | 8/2012 | Franken | F01N 13/1805 285/406 |
| 2008/0060351 A1* | 3/2008 | Pawson | F01N 3/00 60/299 |
| 2011/0120085 A1 | 5/2011 | Saito et al. | |
| 2014/0373491 A1* | 12/2014 | Harbur | B01D 46/4272 55/425 |

* cited by examiner

APPARATUS, SYSTEM, AND METHOD FOR ASSEMBLY OF AN EXHAUST AFTERTREATMENT COMPONENT

CROSS-REFERENCES TO RELATED APPLICATIONS

This application claims the priority benefit of International Patent Application No. PCT/US2013/070533, filed on Nov. 18, 2013 and entitled "Apparatus, System and Method for Assembly of an Exhaust Aftertreatment Component", and U.S. Provisional Patent Application No. 61/727,512, filed on Nov. 16, 2012, the entire contents of which are incorporated by reference herein.

BACKGROUND

Some exhaust aftertreatment systems for treating exhaust gas generated by an internal combustion engine include component assemblies. Each of the component assemblies include at least one exhaust treating component, such as a catalyst or filter. Typically, the exhaust treating component is retained within a housing. The housing is often coupled to inlet and outlet modules each with a respective housing.

The various housings of an exhaust component assembly are coupled together by mating opposing flanges of the housings and securing the opposing flanges together via a clamp, such as a V-band clamp. A gasket is often placed between the opposing flanges to create a seal for preventing the escape of exhaust gas from between the housings. However, proper placement and alignment of the gaskets relative to the opposing flanges is difficult using conventional assembly techniques. For example, the gasket is prone to slippage and misalignment before the gasket is properly clamped between the opposing flanges. Similarly, the opposing flanges also are prone to slippage and misalignment relative to each other before the flanges are clamped together.

Some exhaust component assemblies attempt to incorporate insulation to reduce heat loss from the housings. However, current insulation techniques and components fail to provide adequate resistance to heat loss. Additionally, the assembly of exhaust components that incorporate insulation is often onerous, mistake-prone, and time consuming.

SUMMARY

The subject matter of the present application has been developed in response to the present state of the art, and in particular, in response to the problems and needs in art associated with exhaust aftertreatment component assemblies that have not yet been fully solved by currently available component assemblies, and associated methods of assembly. Accordingly, the subject matter of the present application has been developed to provide an exhaust aftertreatment component assembly, and associated apparatus, systems, and methods, that overcomes many of the shortcomings of the prior art.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
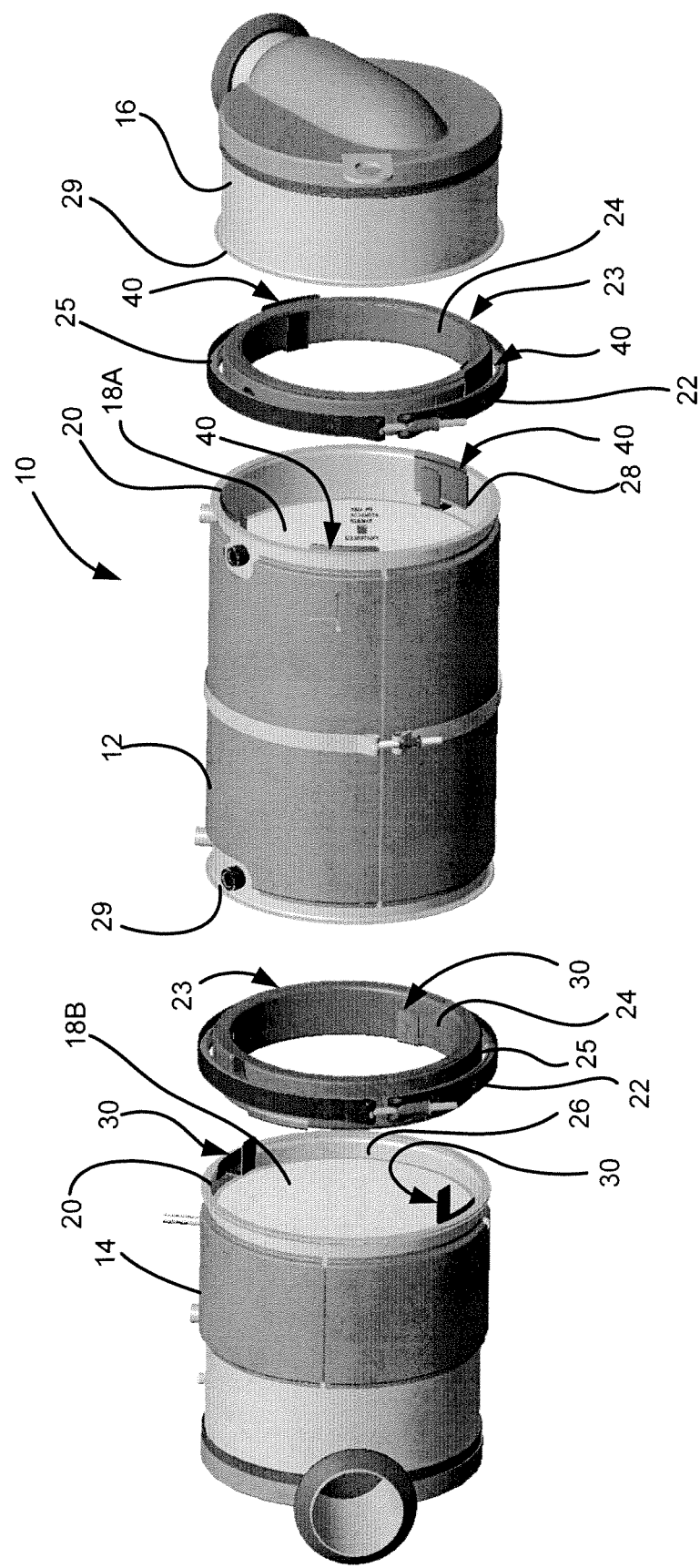
FIG. 1 is an exploded perspective view an exhaust aftertreatment component assembly according to one embodiment.

Referring to FIG. 1, according to one embodiment, an exhaust aftertreatment component assembly 10 may form part of an exhaust aftertreatment system in exhaust receiving communication with an internal combustion engine, such as a diesel-powered engine. Generally, the component assembly 10 includes a housing that houses an exhaust treatment component. In the illustrated embodiment, the housing of the component assembly 10 includes various housing sections each coupleable to each other. For example, the component assembly 10 includes a main housing 12, an inlet housing 14, and an outlet housing 16. The main housing 12 houses an exhaust treatment component 18A, which can be any of various exhaust treatment components, such as a particulate matter filter, oxidation catalyst, emissions reduction catalyst, and the like. The inlet and outlet housings 14, 16, may or may not house exhaust treatment components. In the illustrated embodiment, the inlet housing 14 houses an exhaust treatment component 18B, which can be the same as the exhaust treatment component 18A (e.g., a first stage of the exhaust treatment component 18A) or different than the exhaust treatment component. Each of the housings 12, 14, 16 includes a substantially hollow tubular element. In the illustrated embodiment, the housings 12, 14, 16 each has a substantially cylindrical shape that defines a central channel.

Each of the housings 12, 14, 16 includes a respective inlet and outlet. The outlet of the inlet housing 12 is coupled to the inlet of the main housing 14, and the outlet of main housing is coupled to the inlet of the outlet housing 16. Accordingly, when coupled together, exhaust gas flows in an exhaust flow direction from the inlet housing 12, through the main housing 14, and into the outlet housing 16. The outlet of the inlet housing 12 and inlet of the main housing 14 include a respective flared end or flange 29. Similarly, the outlet of the main housing 14 and inlet of the outlet housing 16 include a respective flange 29. The flanges facilitate an end-to-end coupling between respective housings during assembly of the component assembly 10. Generally, the flanges of adjacent housings are positioned adjacent each other, and are secured together via a clamping mechanism, such as a respective V-clamp 22, which is positioned about the flanges and essentially compresses them together.

To promote a seal between the mating surfaces of the flanges of adjacent housings, a gasket 20 is positioned between adjacent flanges, and the clamping mechanisms compress the flanges against the gasket. The gasket 20 helps to prevent material from passing between the flanges 29 and leaking from the coupled housings. Generally, the gasket 20 has an annular shape that corresponds with the shape of the mating surfaces of the flanges 29. In certain implementations, the gasket 20 is made from a flexible material, such as rubber, foam, silicone, polymers, graphite, and the like. In some implementations, the flexible material is deformable, compressible, and/or resilient. As the V-clamp 22 is tightened, the gasket 20 presses and at least partially deforms against the flanges 29 to create a seal or barrier between the flanges. In other words, the gasket 20 promotes the elimination of openings between the gasket and the flanges.

The component assembly 10 also includes an insulation sub-assembly 23 positioned interiorly of the intersection between the flanges 29 of adjacent housings. The insulation sub-assembly 23 includes a rim 24 with radially outwardly flared ends that define an annular-shaped exterior channel within which an annular-shaped insulation pack 25 is positioned (e.g., seated). In one embodiment, the insulation pack 25 includes an insulation material and an outer covering encapsulating the insulation material. The insulation material can be any of various insulation materials, such as, for example, carbon, silica, fiberglass, cellulose, polyurethane, polystyrene, and ceramic. In some implementations, the insulation material includes a plurality of insulating fibers made of the insulating materials. The insulation pack 25 may be relatively flexible. Accordingly, the rim 24 may be made from a relatively rigid material to provide a rigid framing for the insulation sub-assembly 23. The insulation sub-assemblies 23 are positioned adjacent a respective flange coupling of the component assembly 10 to reduce heat loss from between the flanges 29. In certain implementations, the insulation sub-assemblies 23 are positioned within the housing of the component assembly 10 such that the insulation pack 25 is compressed against the interior of the housing at the intersection of adjacent flanges 29.

Assembling together two housings of the component assembly 10 requires the gasket 20 to be aligned with both of the adjacent flanges 29 of the housings. Alignment with the adjacent flanges 29 demands the gasket 20 be coaxially aligned with the housings and flanges 29 such that the gasket 20 properly contacts and is compressed against the mating surfaces of the flanges. However, maintaining the gasket 20 in coaxial alignment with the housings while coupling the flanges 29 together and securing them with the V-clamp 22 can be difficult. Accordingly, the component assembly 10 includes a plurality of alignment brackets 30, 40 configured to assist with the alignment of the gasket 20 relative to the housings and associated flanges 29 during assembly of the component assembly 10. The alignment brackets 30, 40 are coupled to the interior walls 26, 28 of the inlet and main housings 14, 12, respectively, at locations adjacent the flanges 29 defining the outlets of the housings. Alternatively, in some embodiments, the alignment brackets 30, 40 can be coupled to the interior walls 26, 28 of the inlet and main housings 14, 12, respectively, at locations adjacent the flanges 29 defining the inlets of the housings. Each of the inlet and main housings 14, 12 can have any number of alignment brackets 30, 40, respectively. In the illustrated embodiment, the inlet and main housings 14, 12 each have four alignment brackets 30, 40 spaced an equal distance apart from each other (see, e.g., FIG. 4). It is noted that two of the four alignment brackets 30, 40 are shown in FIG. 1 as being attached to the respective housings 14, 12 and engaged with corresponding gaskets 20, and the other two alignment brackets are shown removed from respective housings and engaged with corresponding insulation sub-assemblies 23 for illustrative purposes.

Generally, the alignment brackets 30, 40 are fixed to the housings 14, 12 and configured to support in place the corresponding gasket 20 and insulation sub-assembly 23 in co-axial alignment with the associated housing while the assembly 10 is assembled (e.g., while the housings 12, 14, 16 are coupled to each other). Also, the alignment brackets 30, 40 support adjacent housings together in a coaxial arrangement while the clamping mechanism is positioned about and clamps the housings together.

Figure 2:
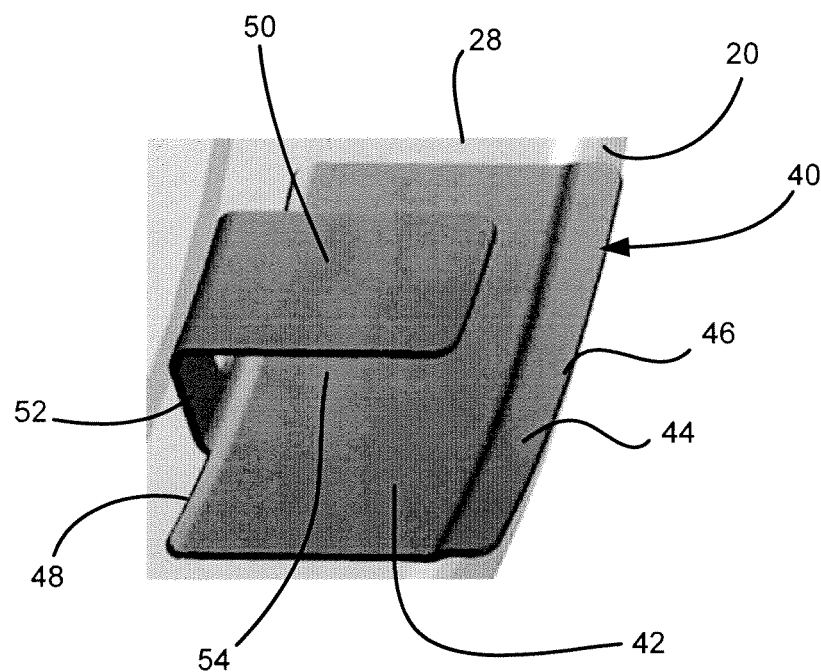
FIG. 2 is a perspective view of an alignment bracket according to one embodiment shown secured to a housing of an exhaust aftertreatment component assembly.

Referring to FIG. 2, the alignment bracket 40, which is representative of alignment bracket 30, includes a base 42 that engages and is secured to the interior surface (e.g., interior surface 28) of a housing. The base 42 can be a plate-like element, and as illustrated, can be curved to match the curvature of the interior surface of the housing. In this manner, the base 42 can be mounted flush against the interior surface of the housing. The base 42 is secured to the interior surface via any of various coupling techniques, such as welding, bonding, adhering, fastening, and the like. The alignment bracket 40 also includes a support tab 44 or overhang that, when the alignment bracket is attached to the interior surface 28 of the housing, the support tab 44 is stepped radially inwardly toward a central axis of the housing. Moreover, when attached to the housing, the support tab 44 extends axially beyond the end or flange of the housing to a free end 44 opposite a fixed end 48 of the base 42. In some implementations, the support tab 44 extends from the end or flange of the housing a length at least as long as the combined widths of the gasket 20 and flange 29 of the adjacent housing (see, e.g., FIG. 6). In some implementations, the support tab 44 is not stepped, but simply is a non-stepped extension of the base.

The alignment bracket 40 includes an insulation arm for receiving and supporting an insulation sub-assembly 23. The insulation arm includes a support portion 50 and a stop portion 52. The stop portion 52 extends substantially transversely away from the fixed end 48 of the base 42 (i.e., radially inwardly when the alignment bracket 40 is properly secured to a housing). The length of the stop portion 52 is approximately equal to, or just larger than, a thickness of the insulation sub-assembly 23. The support portion 50 extends from a radially inward end of the stop portion 52 in a direction substantially parallel to the base 42 toward the free end 44. Generally, the support portion 50 extends a length greater than one-half the width of the insulation sub-assembly 23 (see, e.g., FIG. 6). The support portion 50 is spaced-apart from the base 42 such that an insulation receiving space 54 is defined between the support portion, stop portion 52, and base 42. The insulation receiving space 54 is thus sized and shaped to receive and retain a portion of the insulation sub-assembly.

Figure 3:
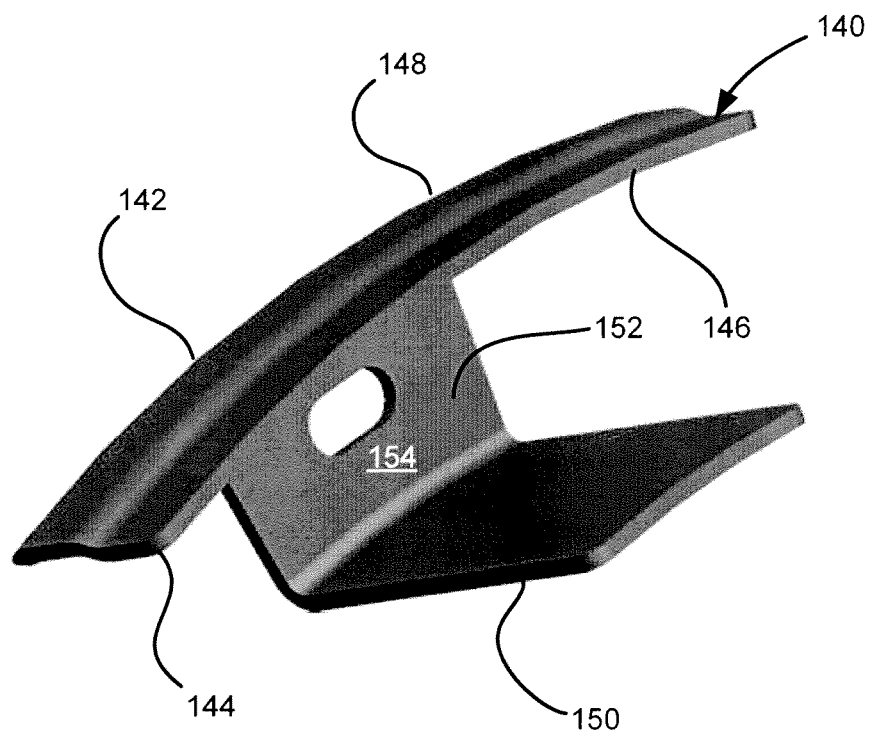
FIG. 3 is a perspective view of an alignment bracket according to yet another embodiment.

Referring to FIG. 3, an alignment bracket 140 includes features similar to the features of the alignment bracket 40, with like numbers referring to like features. However, the base 142 of the alignment bracket 140 is narrower and circumferentially longer than the base 42 of the alignment bracket 40. Accordingly, the alignment bracket 140 may be particularly applicable to component assemblies with housings where open interior surface space for brackets is at a premium, or for larger housings.

Figure 4:
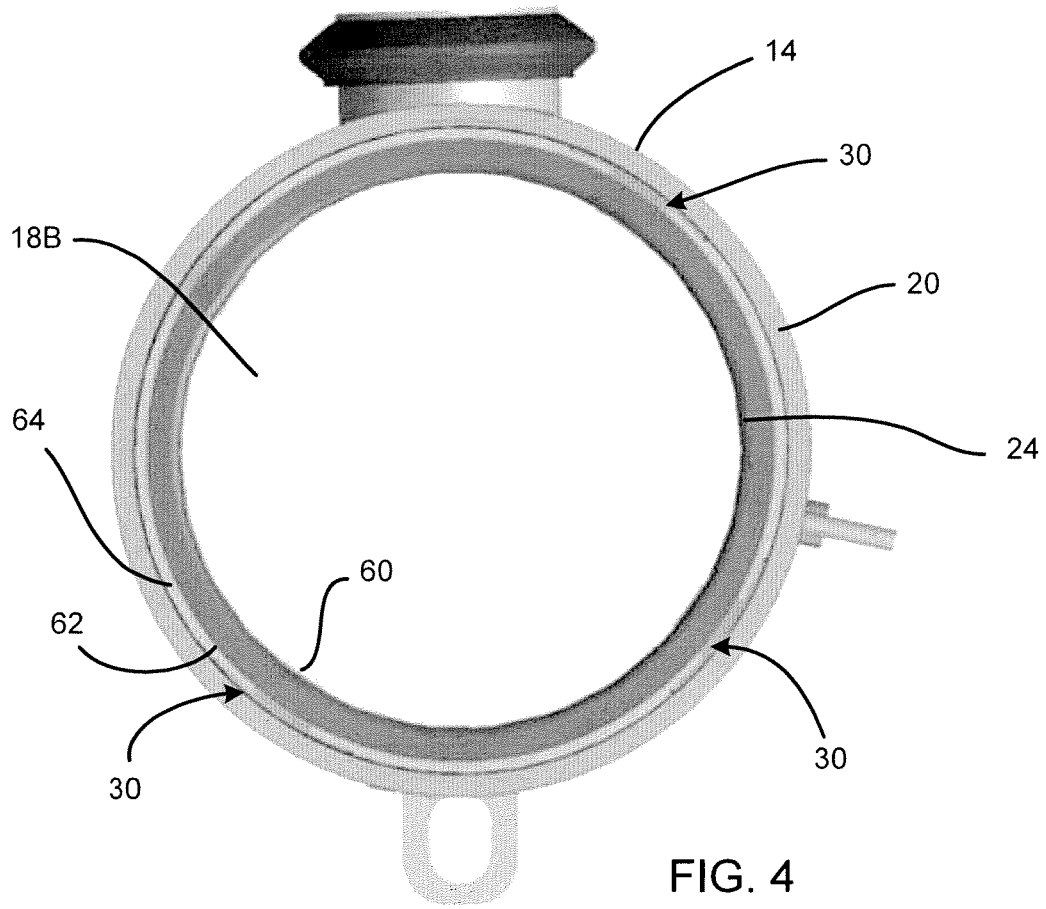
FIG. 4 is an end view of an exhaust aftertreatment component assembly according to one embodiment.
Figure 5:
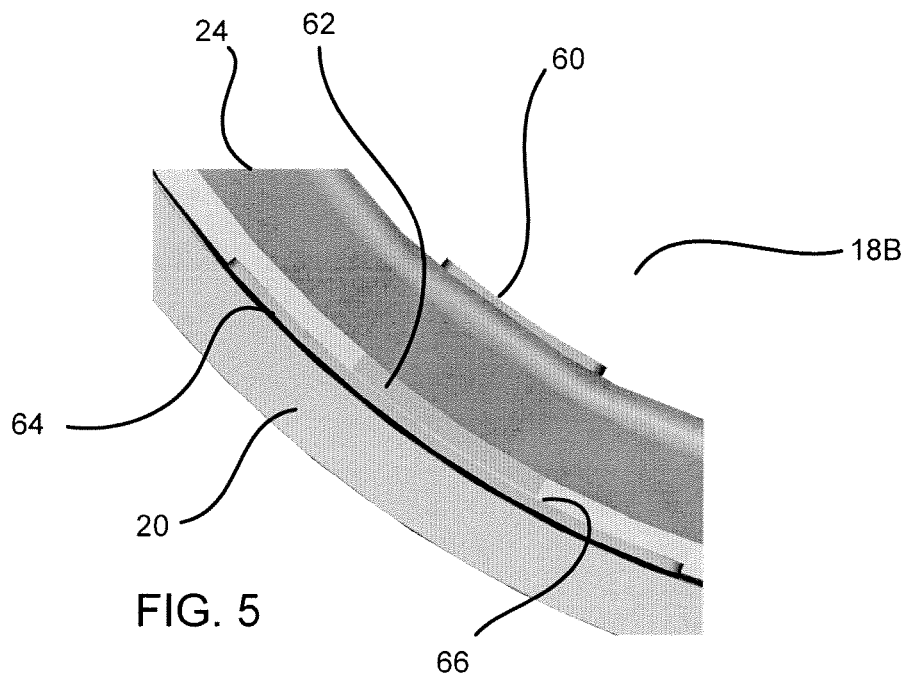
FIG. 5 is a detailed end view of an alignment bracket of the aftertreatment component assembly of FIG. 4.

Referring to FIGS. 4 and 5, four alignment brackets 30 are shown attached to the interior surface of the housing an equal distance apart from each other. Although the alignment brackets 30 are spaced an equal distance apart from each other in the illustrated embodiment, in other embodiments, the alignment brackets 30 are not equally spaced apart from each other. The gasket 20 also is shown mounted on the support tabs 64 of the brackets 30. As discussed above, when mounted on the support tabs 64, the gasket 20 is maintained in a proper assembly position relative to the mating surfaces of the flanges without the need for manually holding the gasket in place. Also shown is the rim 24 of the insulation sub-assembly 23 positioned within the insulation receiving space defined by the support and stop portions 60, 62 of the insulation aim, and the base 66 of the bracket. The insulation pack is removed for convenience in showing the arms of the brackets 30.

Figure 6:
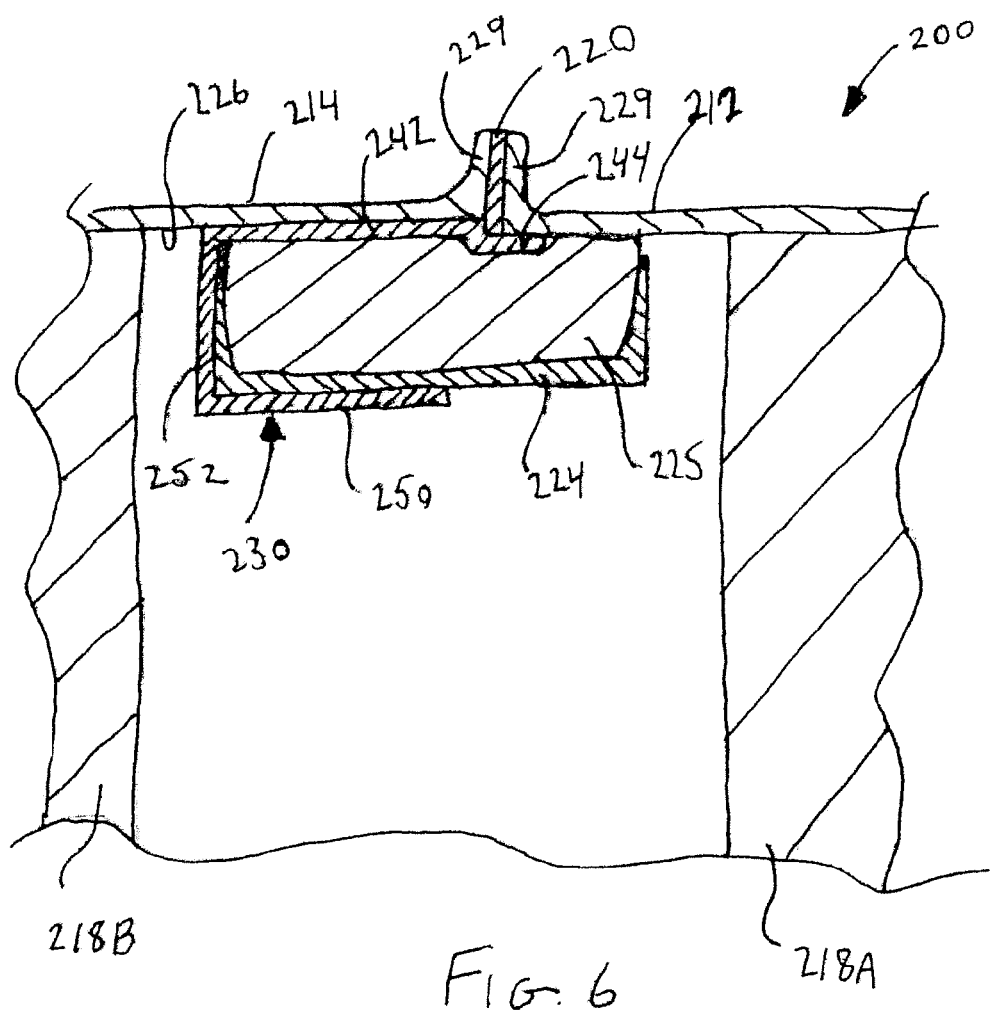
FIG. 6 is a cross-sectional side view of a section of an exhaust aftertreatment component assembly according to one embodiment.

Referring to FIG. 6, the coupling between respective housings 214, 212 of an exhaust treatment component assembly 200 is shown. The component assembly 200 is similar to the component assembly 10, with like numbers referring to like features. The alignment bracket 230 is attached to the interior surface 226 of the inlet housing 214 near the outlet end of the housing or flange 229. The gasket 220 is supported on the support tab 244 in proper position and alignment with respect to the flange 229 of the main housing 212. The support tab 244 also supports the inlet end (e.g., flange 229) of the main housing 212 such that the main housing and associated flange are supported in proper position and alignment with respect to the inlet housing 214 and associated flange. Further, the support and stop portions 250, 252 of the alignment bracket 230 support the insulation sub-assembly in place radially interiorly of the intersection of the flanges 229. As shown, the insulation pack 225 is at least partially compressed against the interior surfaces of the housings at the flanges 229, as well as against the gasket 220.

In certain embodiments, once the alignment brackets are mounted to the outlet ends of the housings of the component assembly, reverse mounting of the outlet end of the main housing with the outlet end of the inlet housing is prevented because the brackets provide a visual indicator of the proper orientation of the housings relative to each other. Additionally, because the alignment brackets extend about only portions of the inner circumference of the housings, the alignment brackets do not significantly obstruct the flow and affect the backpressure of the exhaust gas flowing through the housings. The alignment brackets can be made using any of various manufacturing techniques, such as stamping, bending, casting, molding, and the like.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Reference throughout this specification to features, advantages, or similar language does not imply that all of the features and advantages that may be realized with the subject matter of the present disclosure should be or are in any single embodiment or implementation of the subject matter. Rather, language referring to the features and advantages is understood to mean that a specific feature, advantage, or characteristic described in connection with an embodiment is included in at least one embodiment of the subject matter of the present disclosure. Discussion of the features and advantages, and similar language, throughout this specification may, but do not necessarily, refer to the same embodiment or implementation.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An exhaust aftertreatment component assembly, comprising:
   a first housing having a first end;
   a second housing having a second end, the second end being coupled to the first end;
   at least one alignment bracket coupled to the first housing proximate the first end, each of the at least one alignment bracket including a base secured to an interior surface of the first housing, and a support tab extending from the base, the support tab stepped inwardly towards an interior of the first housing; and an annular gasket supported on the at least one alignment bracket between the first and second ends.

2. An alignment bracket configured to be secured to an interior surface of a housing of an exhaust aftertreatment component assembly, comprising:

a base having a curved surface conforming to the interior surface of the housing, the base having a length that is less than a circumference of the interior surface;

a support tab extending from the base, the support tab being configured such that, when the alignment bracket is secured to the interior surface of the housing, the support tap is stepped inwardly towards an interior of the housing;

a stop arm extending substantially transversely from the base;

a support arm extending substantially transversely from the stop arm and substantially parallel to the base; and an insulation receiving space defined between the base, stop arm, and support arm.

3. An exhaust aftertreatment component assembly, comprising:

a first housing having a first end;

a second housing having a second end, the second end being coupled to the first end;

a plurality of alignment brackets coupled to an interior surface of the first housing proximate the first end, the plurality of alignment brackets being spaced apart from each other, wherein each alignment bracket comprises:

a base secured to an interior surface of the first housing, a support tab extending from the base axially beyond the first end of the first housing, the support tab stepped inwardly towards an interior of the first housing, and an insulation aim defining an insulation receiving space radially inwardly of the interior surface, and wherein the second end of the second housing is supported on the support tabs of the plurality of alignment brackets;

an annular gasket supported on the support tabs of the plurality of alignment brackets between the first and second ends; and an insulation pack positioned within the insulation receiving space and supported by the insulation arm.

4. The exhaust aftertreatment component assembly of claim 1, wherein the at least one alignment bracket is coupled to an interior wall of the first housing proximate to the first end.

5. The exhaust aftertreatment component assembly of claim 4, wherein the base is curved to match a curvature of the interior surface of the first housing.

6. The exhaust aftertreatment component assembly of claim 5, wherein each of the first end of the first housing and the second end of the second housing include flanges, the gasket positioned between the flanges.

7. The exhaust aftertreatment component assembly of claim 6, wherein the support tab is stepped radially inwardly towards a central axis of the first housing, and wherein the support tab supports the gasket in proper position and alignment with respect to the first housing and the flanges.

8. The exhaust aftertreatment component assembly of claim 7, wherein the support tab extends from the first end of the housing a length at least as long as a combined width of the gasket and the flanges.

9. The exhaust aftertreatment component assembly of claim 5, further comprising:

an insulation sub-assembly positioned interior of an intersection of the flanges of the first end of the first housing and the second end of the second housing.

10. The exhaust aftertreatment component assembly of claim 9, wherein the insulation sub-assembly is supported on the at least one alignment bracket between the first end and the second end.

11. The exhaust aftertreatment component assembly of claim 10, wherein the at least one alignment bracket further comprises:

a stop portion extending transversely away from the base from a fixed end of the base; and a support portion extending from a radially inward end of the stop portion parallel to the base towards a free end of the base proximate to the first end, the free end opposite the fixed end, wherein the base, the stop portion and the support portion define an insulation receiving space therebetween for receiving at least a portion of the insulation sub-assembly.

12. The alignment bracket of claim 2, wherein the exhaust aftertreatment component assembly includes an insulation sub-assembly positioned interiorly of the interior surface of the housing, at least portion of the insulation sub-assembly positioned within the insulation receiving space.

13. The alignment bracket of claim 2, wherein the base includes a fixed end coupled to the interior surface of the housing, and a free end opposite the fixed end.

14. The alignment bracket of claim 2, wherein the support tab is stepped radially inwardly towards a central axis of the housing.

15. The alignment bracket of claim 14, wherein the support tab extends axially beyond an end of the housing, the support tab supporting the end of the housing.

16. The alignment bracket of claim 15, wherein the exhaust aftertreatment component assembly also includes a gasket positioned at the end of the housing, the support tab further supporting the gasket.

17. The exhaust aftertreatment component assembly of claim 3, wherein the base is curved to match a curvature of the interior surface of the first housing.

18. The exhaust aftertreatment component assembly of claim 17, wherein each of the first end of the first housing and the second end of the second housing include flanges, the gasket positioned between the flanges.

19. The exhaust aftertreatment component assembly of claim 18, wherein the support tab of each of the plurality of alignment brackets is stepped radially inwardly towards a central axis of the first housing.

20. The exhaust aftertreatment component assembly of claim 19, wherein the support tab extends from the first end of the housing a length at least as long as a combined width of the gasket and the respective flanges.

21. The exhaust aftertreatment component assembly of claim 3, wherein the insulation arm includes:

a stop portion extending transversely away from the base from a fixed end of the base; and a support portion extending from a radially inward end of the stop portion parallel to the base towards a free end of the base proximate to the first end, the free end opposite the fixed end, wherein the base, the stop portion and the support portion define the insulation receiving space therebetween.

* * * * *